Patented Apr. 14, 1953

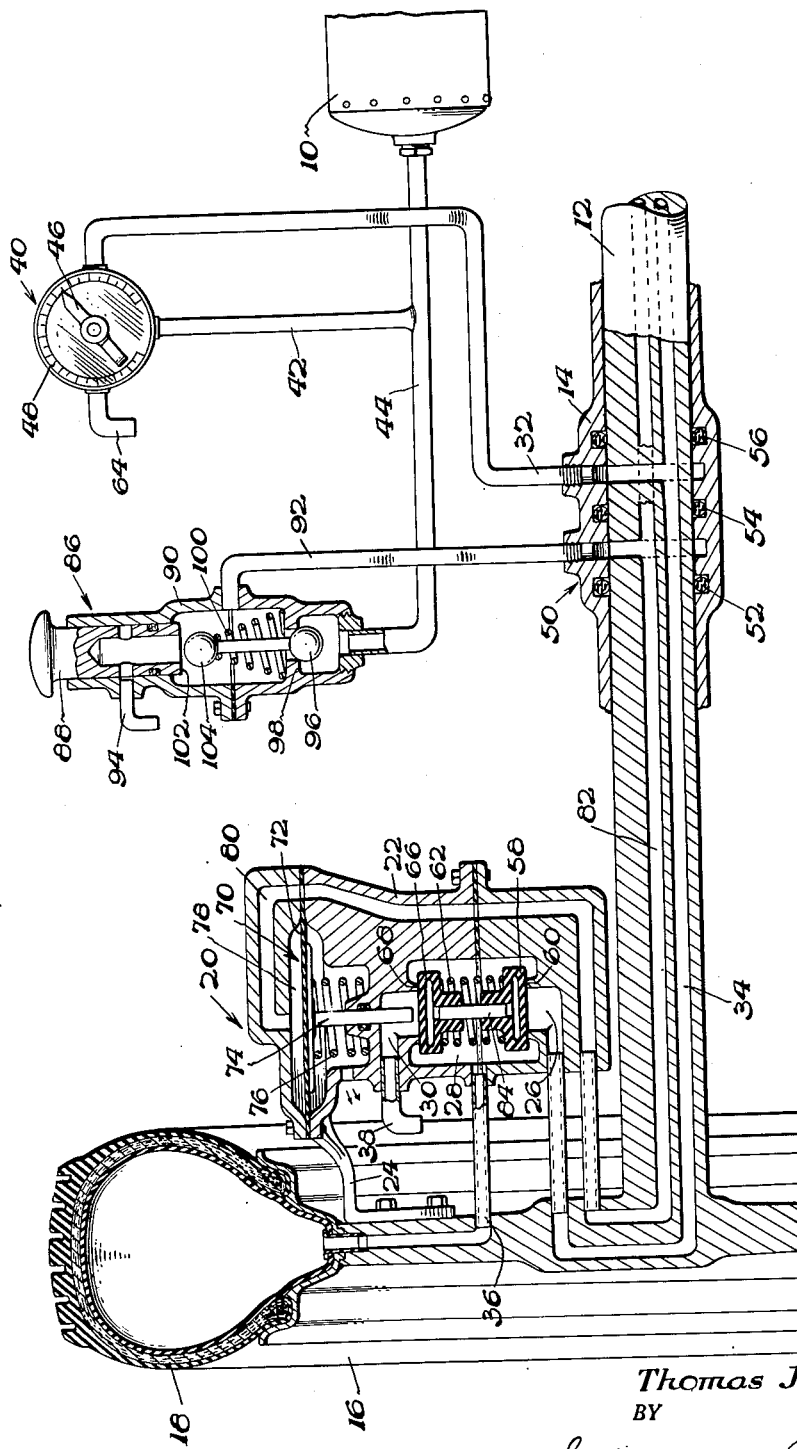

2,634,781

UNITED STATES PATENT OFFICE 2,634,781

TIRE INFLATION CONTROL SYSTEM

Thomas J. Turek, Berkeley, Calif., assignor to Bendix-Westinghouse Automotive Air Brake Company, Elyria, Ohio, a corporation of Delaware Application October 30, 1950, Serial No. 192,888

14 Claims. (Cl. 152—417)

This invention relates to a tire inflation control system for vehicle tires, and more particularly to an arrangement for automatically controlling the pressures in the tires during operation of the vehicle.

In the operation and maintenance of vehicles equipped with pneumatic tires, it is highly desirable to vary the tire pressures for most efficient operation, depending upon road conditions as well as variations in vehicle loading. Systems of this general type wherein the tire pressures are capable of being varied, during vehicle operation, have been heretofore proposed. In such prior systems, a running joint or gland is generally employed between relatively rotating parts, in order to supply the rotating wheels with compressed air from a source carried by the vehicle. Proper sealing of this joint to prevent continuous leakage has presented a serious problem.

In some instances a non-return check valve is utilized for preventing return flow of the compressed air from the tires to the control valve. With such an arrangement, air pressure acting on the running joint may be relieved after the tires have been inflated to the desired pressure. However, the introduction of such check valves renders it impossible to reduce the tire pressure while the vehicle is being operated. While various types of additional valves and controls therefor, have been proposed in order to provide for reducing the tire pressures, none of them have been satisfactory because of the complications involved in the control of pressures between two relatively rotating elements.

It is accordingly an object of the present invention to provide a tire inflation control system which is so constituted as to avoid the objections and disadvantages of the systems heretofore proposed.

Another object is to provide a novel control system of the above character wherein the pressures in the tires may be readily controlled at all times by the operator.

Still another object resides in the provision of a tire inflation control system which includes check valves at the tires, in order that the pressures on the running joint seals may be relieved after the tires have been inflated to a predetermined value, and which includes also, a novel operator controlled arrangement for reducing the tire pressures at will.

A further object is to provide a system of the foregoing type wherein the apparatus for reducing the tire pressures includes a conduit system which utilizes the same running joint seals as are utilized in the tire charging system, thus avoiding the complicated arrangements heretofore considered necessary in effecting a reduction of the tire pressures.

A still further object is to provide a novel control valve construction which may be carried by the vehicle wheel, the arrangement being such that a reduction in the tire pressure may be quickly effected during operation of the vehicle by merely operating a supplemental control valve.

Still another object resides in the provision of a novel tire inflation control system which is materially simplified and which is highly effective in its operation of properly controlling the inflation pressures of the vehicle tires.

Other objects and novel features of the invention will appear more fully hereinafter from a consideration of the following detailed description of the invention when taken in connection with the accompanying drawing, illustrative of one form of the invention. It is to be expressly understood however, that the drawing is utilized for purposes of illustration only and is not designed as a definition of the limits of the invention, reference being had for this purpose to the appended claims.

Referring to the drawing, the single figure thereof discloses diagrammatically and in section, a tire inflation control system embodying the principles of the present invention, and including a reservoir 10 of compressed air, a rotatable axle 12, a stationary axle housing 14, and a vehicle wheel 16 on which a pneumatic tire 18 is mounted in any well known manner. While the invention has been depicted in the drawing as being associated with one vehicle wheel, it will be readily understood that this is by way of example only, and that control of the inflation pressures of all vehicle wheels is contemplated.

In order to control the degree of pressure in the tire 18, the present invention includes a novel control valve mechanism 20 which includes a casing 22, carried by the wheel 16 as by means of a bracket 24. Such control valve is formed to provide an inlet chamber 26, an outlet chamber 28 and an exhaust chamber 30, the inlet chamber 26 communicating with a conduit 32 as by means of a duct 34 formed in the axle 12. The outlet chamber 28 is in constant communication with the tire 18 as by means of a conduit 36, while the exhaust chamber 30 is constantly open to the atmosphere through an atmospheric connection 38.

For the purpose of supplying fluid pressure to the inlet chamber 26 of the control valve 20, a feed valve 40 is connected with the reservoir 10 as by means of conduits 42 and 44. This feed valve may be of any well known construction and includes a rotatable valve member which is so constructed and arranged as to conduct a predetermined pressure from the reservoir 10 to the conduit 32, depending upon the setting of the valve. As shown the valve is provided with an indicator 46 cooperable with a scale 48 so that by adjusting the valve to the desired pressure condition, such predetermined pressure will be conducted from the reservoir 10 to the conduit 32.

In order to provide a suitable connection between the relatively rotatable parts 12 and 14, the latter is provided with a running joint or gland 50 which includes rotary seals 52, 54 and 56. With such an arrangement, it will be readily perceived that proper and efficient sealing between the relatively rotatable parts 12 and 14 is secured so that as air pressure is conducted from the reservoir 10 to the inlet chamber 26 of the inlet valve 20, undue loss of pressure will be prevented.

A novel arrangement is provided by the invention for relieving the air pressure acting on the seals of the running joint 50 after the tire has been inflated to its proper pressure. As shown, such means includes a check valve 58 which is resiliently urged to its seat 60 as by means of a spring 62. Due to this construction, it will be readily understood that after the tire 18 has been inflated to its proper pressure, the feed valve 40 may be moved to its zero or open position in order to connect the conduit 32 with an atmospheric connection 64. When this occurs, it will be clearly seen that the inlet chamber 26 and duct 34 will likewise be exhausted, thus relieving all fluid pressure from the seals of the running joint 50. Due to the self-closing action of the check valve 58, the pressure within the tire 18 will be maintained at its then value. In addition to the action of the spring 62, the check valve 58 is maintained in closed position by the substantial pressure differential created on opposite sides thereof, when the feed valve 40 is moved to open position.

With the foregoing construction, it will be readily understood that the supply conduit 32 leading from the feed valve 40, may be connected through similar running joints to supply air pressure to the other tires of the vehicle. It will be likewise understood that the check valve 58 serves to provide an arrangement whereby fluid pressure on the seals of the running joint 50 may be relieved.

In certain instances of vehicle operation, as for example during variations in the condition of the road surfaces or changes in loading conditions, it may be desirable to decrease the pressure in the vehicle tires. The present invention provides a novel arrangement whereby this may be accomplished in a simple yet highly efficient manner. More particularly and as shown, the control valve 20 includes a check valve 66 which is similar to the check valve 58 and which is normally maintained against a seat 68 as by means of the spring 62. In this position, the check valve 66 normally prevents communication between the outlet chamber 28 and the exhaust chamber 30, thus conserving the fluid pressure in the tire 18. However in the event that a reduction in tire pressure is desirable, the invention provides a fluid pressure actuator 70 which includes a pressure responsive diaphragm 72 and an actuating plunger 74. Normally, the plunger and diaphragm are maintained in the position illustrated as by means of a spring 76. However, when it is desired to decrease the pressure in the tire 18, fluid pressure is admitted to a chamber 78 above the diaphragm 72 through a duct 80 formed in the casing 22 and a duct 82 formed in the axle 12. When this occurs, fluid pressure acting on the diaphragm 72 causes downward movement of the plunger 74 to engage the check valve 66 and move the latter off its seat 68. Thus, under these conditions, the tire 18 will be connected with the atmospheric connection 38 by way of conduit 36, outlet chamber 28 and exhaust chamber 30. When the pressure has been reduced sufficiently, the ducts 82 and 80 are exhausted to atmosphere and spring 76 returns the diaphragm 72 to its normal position in order to allow closure of the check valve 66 under the action of its return spring 62.

In addition to the common return spring 62 which acts upon the separate and independent check valves 58 and 66, it will be observed that these two valves are interconnected by a floating pin 84 which allows opening movement of either of the check valves to take place. Such lost motion is such that when the check valve 66 is opened, as indicated above, the opposite ends of the floating pin 84 will abut the associated parts of both the check valves 58 and 66. Due to this construction, when the valve 66 is opened, the valve 58 will be positively maintained in closed position against its seat 60.

A novel arrangement is provided for controlling the flow of air pressure in the conduits 82 and 80 for the purpose of regulating the decrease in tire inflation. As shown, such means includes an exhaust valve 86 having a plunger 88 slidably mounted in a casing 90 and normally maintained in the position shown where a conduit 92, connected with the duct 82, communicates with an exhaust opening 94. Under normal conditions, it will also be observed that communication between the supply conduit 44 and the conduit 92 is shut off by an inlet valve 96 which is moved against its seat 98 as by means of a spring 100. When it is desired to charge the conduit 92, it is only necessary for the operator to depress the plunger 88 whereupon a seat 102 formed at the lower end thereof, engages an exhaust valve 104. This disconnects the conduit 92 from the atmospheric connection 94. Further movement of the plunger 88 moves the intake valve 96 off its seat 98 and conducts full reservoir pressure from the reservoir 10 to the chamber 78 by way of conduits 44 and 92 and ducts 82 and 80. Thus, the valve 86 together with the pressure responsive device 70, constitute a novel arrangement for opening the check valve 66 for the purpose of reducing the tire pressure at will and during operation of the vehicle. It is noted that the conduit 92 is associated with the duct 82 through the running joint 50 and utilizes the seals 52 and 54 for sealing purposes. Thus, no additional running joints or complicated mechanisms are required for securing a reduction in tire inflation pressure.

In operation, and with the parts occupying the positions illustrated, it is only necessary for the operator to set the feed valve 40 at the desired inflation pressure in order to cause an automatic inflation of all of the vehicle tires. As soon as the valve 40 is set, as stated, fluid pressure will be promptly conducted to the tire 18 by way of conduits 42 and 32, duct 34, inlet chamber 26, outlet chamber 28 and conduit 36. As soon as the tires are inflated, the feed valve 40 will be returned to exhaust position in order to relieve the pressure on the seals of the running joint 50. Due to the provision of the check valves 58 and 66, the pressure will be maintained within the tire 18.

Should it at any time be advisable to decrease the pressure in the tire, the feed valve 40 is moved to a position equivalent to the new pressure desired. No change in inflation pressure will occur at this time. When however the plunger 88 of the exhaust valve 86 is depressed, full reservoir pressure will be admitted to the chamber 78 above the diaphragm 72 by way of conduits 44 and 92, and ducts 82 and 80. When this occurs, the plunger 74 will be moved downwardly to open the check valve 66 and thus connect the tire 18 with the atmospheric connection 38. When the check valve 66 is opened, as indicated, it will be understood that the floating pin 84 will contact the associated portion of the check valve 58 and serve to positively maintain the latter in its closed position against the pressure existing in the inlet chamber 26.

When the pressure in the tire 18 has been lowered to a point somewhat below the pressure for which the feed valve 40 is set, the plunger 88 is moved to the position indicated in order to exhaust the chamber 78 to atmosphere by way of ducts 80 and 82, conduit 92 and exhaust opening 94. As soon as this occurs, the pressure in the chamber 26 moves the check valve 58 open in order to bring the pressure in the tire 18 up to the value determined by the setting of the feed valve 40.

There has thus been provided by the present invention, a novel tire inflation control system which includes a highly efficient arrangement for controlling the inflation pressures of the vehicle tires. The provision of the feed valve 40 and the check valve 58 secures a relatively simple arrangement for bringing the tires up to a predetermined inflation pressure whereupon, the feed valve 40 may be exhausted in order to relieve the fluid pressure acting on the seals of the running joint 50. A further feature resides in the use of the check valve 66 which is controlled in a novel manner by the fluid pressure device 70 in order to reduce the inflation pressure at the will of the operator, and during operation of the vehicle. The deflation control arrangement is such that the same running joint 50 is utilized for sealing the relatively rotating parts 12 and 14.

While one embodiment of the invention has been illustrated and described herein with considerable particularity, it will be well understood by those skilled in the art that various modifications may be resorted to without departing from the spirit of the invention. Reference will therefore be had to the appended claims for a definition of the limits of the invention.

What is claimed is:

1. A tire inflation control system for a vehicle wheel having a pneumatic tire mounted thereon, comprising a control valve carried by the wheel and provided with a casing having an outlet chamber in communication at all times with the tire and having also an exhaust chamber in communication at all times with the atmosphere, a source of compressed air, means including a conduit for conducting compressed air from said source to said outlet chamber, a first spring-closed check valve in said outlet chamber for preventing return flow of compressed air from the outlet chamber to said conduit, a second spring-closed check valve in said outlet chamber for normally preventing communication between the outlet chamber and the exhaust chamber, and means carried by the casing for opening said second check valve to connect the outlet chamber with the exhaust chamber to reduce the pressure in the tire.

2. A tire inflation control system for a vehicle wheel having a pneumatic tire mounted thereon, comprising a control valve carried by the wheel and provided with a casing having an outlet chamber in constant communication with the tire and having also an exhaust chamber in constant communication with the atmosphere, a source of compressed air, means including a conduit for conducting compressed air from said source to said outlet chamber, a first spring-closed check valve in said outlet chamber for preventing return flow of compressed air from the outlet chamber to said conduit, a second spring-closed check valve in said outlet chamber for normally preventing communication between the outlet chamber and the exhaust chamber, means carried by the casing for opening said second check valve to connect the outlet chamber with the exhaust chamber to reduce the pressure in the tire, and means for positively holding the first check valve closed when the second check valve is opened.

3. A tire inflation control system for a vehicle wheel having a pneumatic tire mounted thereon, comprising a control valve carried by the wheel and provided with a casing having an outlet chamber in constant communication with the tire and having also an exhaust chamber in constant communication with the atmosphere, a source of compressed air, means including a conduit for conducting compressed air from said source to said outlet chamber, a first spring-closed check valve in said outlet chamber for preventing return flow of compressed air from the outlet chamber to said conduit, a second spring-closed check valve in said outlet chamber for normally preventing communication between the outlet chamber and the exhaust chamber, means carried by the casing for opening said second check valve to connect the outlet chamber with the exhaust chamber to reduce the pressure in the tire, and means movable with said second check valve to positively hold the first check valve closed when the second check valve is opened.

4. A tire inflation control system for a vehicle wheel having a pneumatic tire mounted thereon, comprising a control valve carried by the wheel and provided with a casing having an outlet chamber in communication at all times with the tire and having also an exhaust chamber in communication at all times with the atmosphere, a source of compressed air, means including a conduit for conducting compressed air from said source to said outlet chamber, a first spring-closed check valve in said outlet chamber for preventing return flow of compressed air from the outlet chamber to said conduit, a second spring-closed check valve in said outlet chamber for normally preventing communication between the outlet chamber and the exhaust chamber, and operator controlled means for reducing the pressure in the tire, comprising a fluid pressure responsive device carried by the wheel and having a part movable to open said second check valve to connect the outlet chamber with the exhaust chamber, and means including a conduit for conducting compressed air from said source to said device.

5. A tire inflation control system for a vehicle wheel having a pneumatic tire mounted thereon, comprising a control valve carried by the wheel and provided with a casing having an outlet chamber in constant communication with the tire and having also an exhaust chamber in constant communication with the atmosphere; a source of compressed air, means including a conduit for conducting compressed air from said source to said outlet chamber, a first spring-closed check valve in said outlet chamber for preventing return flow of compressed air from the outlet chamber to said conduit, a second spring-closed check valve in said outlet chamber for normally preventing communication between the outlet chamber and the exhaust chamber, and operator controlled means for reducing the pressure in the tire, comprising a fluid pressure responsive device carried by the wheel and having a part movable to open said second check valve, means including a conduit for conducting compressed air from said source to said device, and means for positively holding the first check valve closed when the second check valve is opened.

6. A tire inflation control system for a vehicle wheel having a pneumatic tire mounted thereon, comprising a control valve carried by the wheel and provided with a casing having an outlet chamber in constant communication with the tire and having also an exhaust chamber in constant communication with the atmosphere, a source of compressed air, means including a conduit for conducting compressed air from said source to said outlet chamber, a first spring-closed check valve in said outlet chamber for preventing return flow of compressed air from the outlet chamber to said conduit, a second spring-closed check valve in said outlet chamber for normally preventing communication between the outlet chamber and the exhaust chamber, and operator controlled means for reducing the pressure in the tire, comprising a fluid pressure responsive device carried by the wheel and having a part movable to open said second check valve, means including a conduit for conducting compressed air from said source to said device, and means movable with said second check valve to positively hold the first check valve closed when the second check valve is opened.

7. A tire inflation control system for a vehicle wheel having a pneumatic tire mounted thereon, comprising a control valve carried by the wheel and provided with a casing having an outlet chamber in communication at all times with the tire and having also an exhaust chamber in communication at all times with the atmosphere, a source of compressed air, means including a conduit for conducting compressed air from said source to said outlet chamber, a pair of separate check valves both positioned in said outlet chamber, one of said check valves preventing return flow of compressed air from the outlet chamber to said conduit, and the other check valve normally preventing communication between the outlet and exhaust chambers, a spring interposed between said check valves to yieldably maintain the latter in closed position, and means carried by the casing for opening said other check valve to connect the outlet chamber with the exhaust chamber to reduce the pressure in the tire.

8. A tire inflation control system for a vehicle wheel having a pneumatic tire mounted thereon, comprising a control valve carried by the wheel and provided with a casing having an outlet chamber in constant communication with the tire and having also an exhaust chamber in constant communication with the atmosphere, a source of compressed air, means including a conduit for conducting compressed air from said source to said outlet chamber, a pair of separate check valves in said outlet chamber, one of said check valves preventing return flow of compressed air from the outlet chamber to said conduit, and the other check valve normally preventing communication between the outlet and exhaust chambers, a spring interposed between said check valves to yieldably maintain the latter in closed position, means carried by the casing for opening said other check valve to connect the outlet chamber with the exhaust chamber to reduce the pressure in the tire, and means for positively holding said one check valve closed when said other check valve is opened.

9. A tire inflation control system for a vehicle wheel having a pneumatic tire mounted thereon, comprising a control valve carried by the wheel and provided with a casing having an outlet chamber in constant communication with the tire and having also an exhaust chamber in constant communication with the atmosphere, a source of compressed air, means including a conduit for conducting compressed air from said source to said outlet chamber, a pair of separate check valves in said outlet chamber, one of said check valves preventing return flow of compressed air from the outlet chamber to said conduit, and the other check valve normally preventing communication between the outlet and exhaust chambers, a spring interposed between said check valves to yieldably maintain the latter in closed position, means carried by the casing for opening said other check valve to connect the outlet chamber with the exhaust chamber to reduce the pressure in the tire, and means movable with said other check valve to positively hold said one check valve closed when said other check valve is opened.

10. A tire inflation control system for a vehicle wheel having a pneumatic tire mounted thereon, comprising a control valve carried by the wheel and provided with a casing having an outlet chamber in communication at all times with the tire and having also an exhaust chamber in communication at all times with the atmosphere, a source of compressed air, means including a conduit for conducting compressed air from said source to said outlet chamber, a pair of separate check valves both positioned in said outlet chamber, one of said check valves preventing return flow of compressed air from the outlet chamber to said conduit, and the other check valve normally preventing communication between the outlet and exhaust chambers, a spring interposed between said check valves to yieldably maintain the latter in closed position, and operator controlled means for reducing the pressure in the tire, comprising a fluid pressure responsive device carried by the wheel and having a part movable to open said other check valve to connect the outlet chamber with the exhaust chamber, and means including a conduit for conducting compressed air from said source to said device.

11. A tire inflation control system for a vehicle wheel having a pneumatic tire mounted thereon, comprising a control valve carried by the wheel and provided with a casing having an outlet chamber in constant communication with the tire and having also an exhaust chamber in constant communication with the atmosphere, a source of compressed air, means including a conduit for conducting compresed air from said source to said outlet chamber, a pair of separate check valves in said outlet chamber, one of said check valves preventing return flow of compressed air from the outlet chamber to said conduit, and the other check valve normally preventing communication between the outlet and exhaust chambers, a spring interposed between said check valves to yieldably maintain the latter in closed position, and operator controlled means for reducing the pressure in the tire, comprising a fluid pressure responsive device carried by the wheel and having a part movable to open said other check valve, means including a conduit for conducting compressed air from said source to said device, and means for positively holding said one check valve closed when said other check valve is opened.

12. A tire inflation control system for a vehicle wheel having a pneumatic tire mounted thereon, comprising a control valve carried by the wheel and provided with a casing having an outlet chamber in constant communication with the tire and having also an exhaust chamber in constant communication with the atmosphere, a source of compressed air, means including a conduit for conducting compressed air from said source to said outlet chamber, a pair of separate check valves in said outlet chamber, one of said check valves preventing return flow of compressed air from the outlet chamber to said conduit, and the other check valve normally preventing communication between the outlet and exhaust chambers, a spring interposed between said check valves to yieldably maintain the latter in closed position, and operator controlled means for reducing the pressure in the tire, comprising a fluid pressure responsive device carried by the wheel and having a part movable to open said other check valve, means including a conduit for conducting compressed air from said source to said device, and means movable with said other check valve to positively hold said one check valve closed when said other check valve is opened.

13. A tire inflation control system for a vehicle wheel having a pneumatic tire mounted thereon, comprising a control valve carried by the wheel and provided with a casing having an outlet chamber in constant communication with the tire and having also an exhaust chamber in constant communication with the atmosphere, a source of compressed air, an axle housing, an axle rotatably mounted in said housing and carrying said wheel, conduit means extending from said source to said outlet chamber by way of the axle housing and axle, a feed valve interposed in the conduit means between the source and axle housing for governing the pressure of the air conducted to said outlet chamber, a first spring-closed check valve in said outlet chamber for preventing return flow of compressed air from the outlet chamber to the conduit means, a second spring-closed check valve in said outlet chamber for normally preventing communication between the outlet chamber and the exhaust chamber, and operator controlled means for reducing the pressure in the tire, comprising a fluid pressure responsive device carried by the wheel and having a part movable to open said second check valve, other conduit means extending from the source to the device by way of the axle housing and axle, rotary sealing means between the axle housing and axle for preventing loss of air therebetween, and means for positively holding the first check valve closed when the second check valve is opened.

14. A tire inflation control system as set forth in claim 13 wherein the last named means comprises a pin carried by the check valves and being loosely mounted therebetween so that when the second check valve is opened, the pin is moved by the second check valve to positively hold the first check valve in closed position.

THOMAS J. TUREK.

References Cited in the file of this patent

UNITED STATES PATENTS

| Number | Name | Date |
|---|---|---|
| 1,039,804 | Richart | Oct. 1, 1912 |
| 2,156,841 | Davis | May 2, 1939 |
| 2,452,527 | Peter | Oct. 26, 1948 |